(12) United States Patent
Charriere et al.

(10) Patent No.: US 7,136,666 B2
(45) Date of Patent: Nov. 14, 2006

(54) CONTROL OF THE TRANSMISSION POWER OF A CDMA BASED SYSTEM

(75) Inventors: Patrick Georges Venceslas Charriere, Tetbury (GB); Peter Christian Gunreben, Moehrendrof (DE); Jens Mueckenheim, Nuremberg (DE)

(73) Assignee: Lucent Technologies Inc., Murray Hill, NJ (US)

( * ) Notice: Subject to any disclaimer, the term of this patent is extended or adjusted under 35 U.S.C. 154(b) by 576 days.

(21) Appl. No.: 10/290,619

(22) Filed: Nov. 8, 2002

(65) Prior Publication Data

US 2003/0092463 A1 May 15, 2003

(30) Foreign Application Priority Data

Nov. 12, 2001 (EP) .................................. 01309520

(51) Int. Cl.
*H04B 7/00* (2006.01)
*H04Q 7/20* (2006.01)

(52) U.S. Cl. .................. 455/522; 455/13.4; 455/69; 455/127.5; 455/343.1; 455/346; 455/436; 455/574; 370/335; 370/342

(58) Field of Classification Search ................ 455/522, 455/442, 574, 343.1, 343.2, 343.4, 343.5, 455/13.4, 69, 346, 439, 571, 572, 436, 127.1, 455/127.5; 370/320, 335, 252, 342
See application file for complete search history.

(56) References Cited

U.S. PATENT DOCUMENTS

| 6,154,659 | A | 11/2000 | Jalali et al. ................. 455/522 |
|---|---|---|---|
| 6,341,225 | B1* | 1/2002 | Blanc ......................... 455/522 |
| 6,549,785 | B1* | 4/2003 | Agin .......................... 455/522 |
| 6,564,067 | B1* | 5/2003 | Agin .......................... 455/522 |
| 6,622,024 | B1* | 9/2003 | Koo et al. ................... 455/522 |
| 6,711,150 | B1* | 3/2004 | Vanghi ....................... 370/342 |
| 2003/0003875 | A1* | 1/2003 | Oestreich .................... 455/69 |

FOREIGN PATENT DOCUMENTS

| DK | 199 30 747 A1 | 1/2001 |
|---|---|---|
| EP | 1 054 518 A1 | 11/2000 |
| WO | WO 00/35120 | 6/2000 |

* cited by examiner

*Primary Examiner*—Nay Maung
*Assistant Examiner*—Shaima Q. Aminzay

(57) ABSTRACT

A new and significantly improved approach for controlling the transmission power in the uplink direction of a CDMA-based radio system is disclosed, which provides a transmission power control even with regard to an overall link quality substantially involving a real time reaction on changes in the environment. A CDMA-based radio system is described which comprises an inner power control loop for adjusting the transmission power between a user equipment and at least one base station based on the signal to interference ratio to ensure that the signal to interference ratio is similar to a target signal to interference ratio at least within a predefined range and an outer power control loop for adjusting the target signal to interference ratio based on the link quality to ensure a target link quality necessary for fulfilling a predetermined quality of service in view of link quality at least within a predefined range. The outer power control loop is provided by establishing a first outer power control loop between the at least one base station and the user equipment and by establishing a second outer power control loop between an associated serving radio controller and the at least one base station.

10 Claims, 3 Drawing Sheets

CONTROL OF THE TRANSMISSION POWER OF A CDMA BASED SYSTEM

CROSS REFERENCE TO RELATED APPLICATION

This application claims priority of European Application No. 01309520.3 filed on Nov. 12, 2001.

FIELD OF THE INVENTION

The invention relates to a method and apparatuses for controlling the transmission power in the uplink direction of a CDMA-based radio system.

BACKGROUND OF THE INVENTION

In particular with regard to third-generation (3G) wireless communication networks, Code Division Multiple Access (CDMA) techniques are used in the respective radio access network. In such a CDMA-based-wireless communication network and especially for the reverse link or uplink relating to the physical channel from user equipment, such as a mobile station, to the network, the effect of mutual interference is not negligible. Consequently the control of transmission power is very critical for the overall system performance of the radio access networks and hence, in CDMA-networks the power control is usually split into a fast inner loop and a slower outer loop of power control.

In detail, the inner loop providing fast power control has to mitigate changes in the ratio between signal and interference (SIR). Normally the changes of such signal to interference ratio are caused by fast fading, such as Rayleigh or Ricean fading, by shadowing, e.g. log-normal fading or by changes in the interference level. Ideally the received SIR should remain constant to enable a good reception of the reverse link signal without wasting transmit power at the user equipment. Actually, the inner loop has to adjust the transmit power at the user equipment such that the resulting SIR at the respective base transceiver station (BTS) of the network stays as close as possible to a target value of SIR.

The outer power control loop providing slow power control has to control the current link quality, usually in terms of bit error rate (BER) or block error rate (BLER), depending on requirements of the respective radio bearer service. The received link quality however may still change although the SIR is controlled by the inner power control loop. These changes are particularly caused by variations in a multipath delay profile based, for example, on typical urban and/or hilly terrain, by alterations in the speed of the user equipment or by modifications in the interference characteristics. Consequently, the outer power control loop has to adapt the aforementioned target value of SIR of the inner loop such that the required link quality is met.

In CDMA-systems according to the IS-95 standard, the uplink inner and outer power control loop, i.e. for the transmission from a user equipment to the network, are both located in the base transceiver stations (BTS). For the inner power control loop, the received SIR is estimated at the BTS and is compared against the target SIR. If the estimated SIR is greater than the target SIR, a power-down command is sent to the user equipment using the forward link control channel. Accordingly, a power-up command is sent if the estimated SIR is below the target SIR. Thus, the power command is generally based on values "up" and "down". After the user equipment has received a respective power command, which is sent periodically 800 times per second, the transmit power is correspondingly changed by a predefined power step, usually based on dB. If the user equipment, however, is in a soft handover procedure, it combines the power commands of the respectively associated base transceiver stations. In particular the user equipment decreases its transmit power if any of the power commands asks the user equipment to decrease the transmit power and, hence, a transmit power increase is only performed if all power commands are power "up" commands.

With regard to the outer power loop control of such IS-95 systems, the BLER performance of a respective radio link is determined by checking the received frames or blocks for errors usually using a so called Cyclic Redundancy Check (CRC). If the CRC fails, the block is in error. To meet the required BLER, the target SIR is increased by predefined power up step in dB if a block was detected to be wrong. If the block was received correctly, the target SIR will be decreased by a fraction of the power up step. The correct BLER will be met if the power down step equals the power up step times the target BLER divided by "1-target BLER". In soft handover procedures, however, all base transceiver stations execute their outer power control loop algorithms independently. Consequently, every base station tries to set the target SIR such that the respective required link quality is met.

Thus, one of the problems of a CDMA-system according to the IS-95 standard is that, in soft handover procedures, the uplink outer power control loop is only able to control the link quality of one respective link leg. Since all the links are combined in a frame selection means, which is located in a respective radio network controller, the outer power control loop is not able to control the overall link quality after frame selection is performed due to the fact that the outer power control loop is located in the base transceiver station where no information of the link quality after frame selection is available. Consequently, each of the link legs in soft handover procedures will try to achieve the target quality and, hence, the target SIR values at the base transceiver stations will be set higher than necessary. Thus, the SIR and, accordingly, the transmit power, will be higher than necessary, whereby such transmit power causes a waste in system capacity.

In a UMTS (Universal Mobile Telecommunication System) system the uplink inner power control loop is also located at the base transceiver stations, with the functionality of the uplink inner loop basically similar to the uplink inner power control loop according to the aforementioned IS-95 based system. The only difference is that the power commands are sent 1500 times per second.

However, different than IS-95 based systems, a system based on the UMTS is provided with an uplink outer power control loop which is located in the radio network controller and, thus, it is possible to evaluate the link quality immediately after frame selection is performed. Consequently, the link quality requirements are related exactly to the measurable link quality.

One of the main drawbacks of such a UMTS decentralized power control concept, however, is the large signaling delay between the base transceiver stations and the network controller. In particular, with respect to the power control, the signaling delay located between the inner and the outer power control loop is degrading the speed and performance of the outer power control loop significantly. This causes a reaction to changes in the environment to be delayed, and the control loop needs to slow down to avoid instability problems. Moreover, the decentralized architecture also implies an additional signaling traffic load on the link between the radio network controller (RNC) and an associated NodeB, which may result in problems for radio network operators who depend on third party operators for the connection between the radio network controllers and the NodeBs.

Accordingly, an object of the invention is, to provide with regard to the aforediscussed state of the art, a new and significantly improved approach for controlling the transmission power in the uplink direction of a CDMA-based radio system avoiding the current drawbacks or problems and, in particular, providing a transmission power control even with regard to an overall link quality substantially involving a real time reaction on changes in the environment.

SUMMARY OF THE INVENTION

The invention provides an inner power control loop for adjusting the transmission power between a user equipment and at least one base transceiver station based on the signal to interference ratio such that a target signal to interference ratio at least within a predefined range is ensured, and an outer power control loop for adjusting the target signal to interference ratio based on link quality such that a target link quality is ensured, wherein the outer power control loop is based on a combination of a first outer power control loop established between the at least one base station and the user equipment and of a second outer power control loop established between an associated serving radio controller and the at least one base station.

One of the main advantages is that, by introducing a two-stage uplink outer power control loop, it is possible to fulfill both, the fast reaction on changes in the radio environment and the control of the overall link quality. Accordingly, the target link quality necessary for fulfilling a predetermined quality of service in view of link quality and transmission delay, in particular based on retransmission of error signal components, can be ensured, wherein the first outer power control loop established between the base station and the user equipment may adjust the target signal to interference ratio based on a link quality of a respective signal link which is usually different than the target link quality usually similar to a required overall link quality.

Accordingly, the invention preferably proposes to establish the second outer power control loop such that it ensures the target link quality based on the overall link quality and is adjusting a reference link quality based on that target link quality for the first outer power control loop. Thus, the first outer power loop is enabled to adjust the target signal to interference ratio based on link quality to ensure a kind of reference link quality which is set by the second outer power control loop and is usually different than the required overall link quality. Accordingly, if the overall link quality is not good enough the reference link quality can be tightened. If, however, the overall link quality is too good, the reference link quality may be weakened. Therefore, the use of a reference link quality enables the control of the overall link quality without having the drawback of the large signaling delay between the inner and outer loop.

According to an embodiment, it is proposed to establish the first outer power control loop in the respective base station and the second outer power control loop in the a respective serving radio network controller so that the first control loop is responsible for the fast reaction to changes in the radio environment and the second control loop ensures the overall link quality requirements after frame selection. Accordingly, by correcting the reference link quality based on signal to interference ratio measurement, the main quality control can be performed in the base station. The reference quality correction in the network controller is used to adapt the residual overall link quality deviation due to the imperfect reference quality adaptation. Hence, it is possible to use proprietary link quality estimation techniques since the signal to interference ratio measurements need not be transferred to the radio network controller resulting in significant opportunities to the vendors to optimize the quality control without changing the standardized information flow.

According to a further refinement it is suggested to deactivate the second outer power control loop based on a radio link between the user equipment and only one base station and to activate the second outer power control loop at least based on a multipath radio link being a link between the user equipment and a plurality of base stations.

Accordingly, when the user equipment is connected through one signal radio link handled by one signal base station, or even when the links are in softer handover over several sectors of the same base station, the deactivation substantially avoids any control delay and extra signaling between the base station and the respective radio network controller. If, however, the radio links related to the radio connection are handled by more than one base station, the first and second outer power control loops run parallel and exchange information over the interfaces between the NodeB and the radio network controller for staying synchronized, wherein the second outer power control loop function preferably is the master control loop, whereas the first outer power control loop has only the restricted decision-making power depending on the handicap of the second outer power control loop for fulfilling the required quality of services.

Moreover, according to a further embodiment of the invention it is proposed that the first outer power control loop restrict the target signal to interference ratio to a constant value and/or to a value having a predefined increase based on two successive values in case the target signal to interference ratio is not met by the inner power control loop. With such a restriction of the adjustment of the target signal to interference ratio, a wind-up effect due to an impact of one of the radio links that is not significant on the inner power control loop is avoided.

To further improve the convergence of the overall link quality according to another embodiment, it is further proposed to adapt the reference link quality depending on the difference between the target signal to interference ratio and the respective current signal to interference ratio by the first outer power control loop to avoid too heavy changes in the overall link quality, in particular if the combining gain of the frame selection is changing.

Moreover, for further reducing the signaling load for the respective associated radio network controller with regard to the base transceiver stations, and/or with regard to a plurality of drift radio network controllers, it is further suggested that the first outer power control loop is generating the target signal to interference ratio faster than said second outer power control loop is generating the reference link quality.

Correspondingly, the invention is additionally providing a UMTS system adapted to perform the inventive method by incorporating means adapted to provide a first outer power control loop between at least one base station, and a user equipment for adjusting a target signal to interference ratio, and means adapted to establish a second outer power control loop between an associated serving radio controller and the at least one base station, for ensuring a target link quality necessary for fulfilling a predetermined quality of service.

Moreover, a transceiver apparatus is provided having means for adjusting a target signal to interference ratio based on link quality and adapted to be used for performing the inventive method, especially incorporated within an inventive UMTS-system.

Additionally, a software implementation product is provided adapted to perform the inventive two stage outer power control loop functionality, preferably with an adaptable configuration dependent on the number and types of radio links activated to maintain the radio connection and on the messages exchanged between the different element of the radio network accordingly.

DETAILED DESCRIPTION

Figure 3:
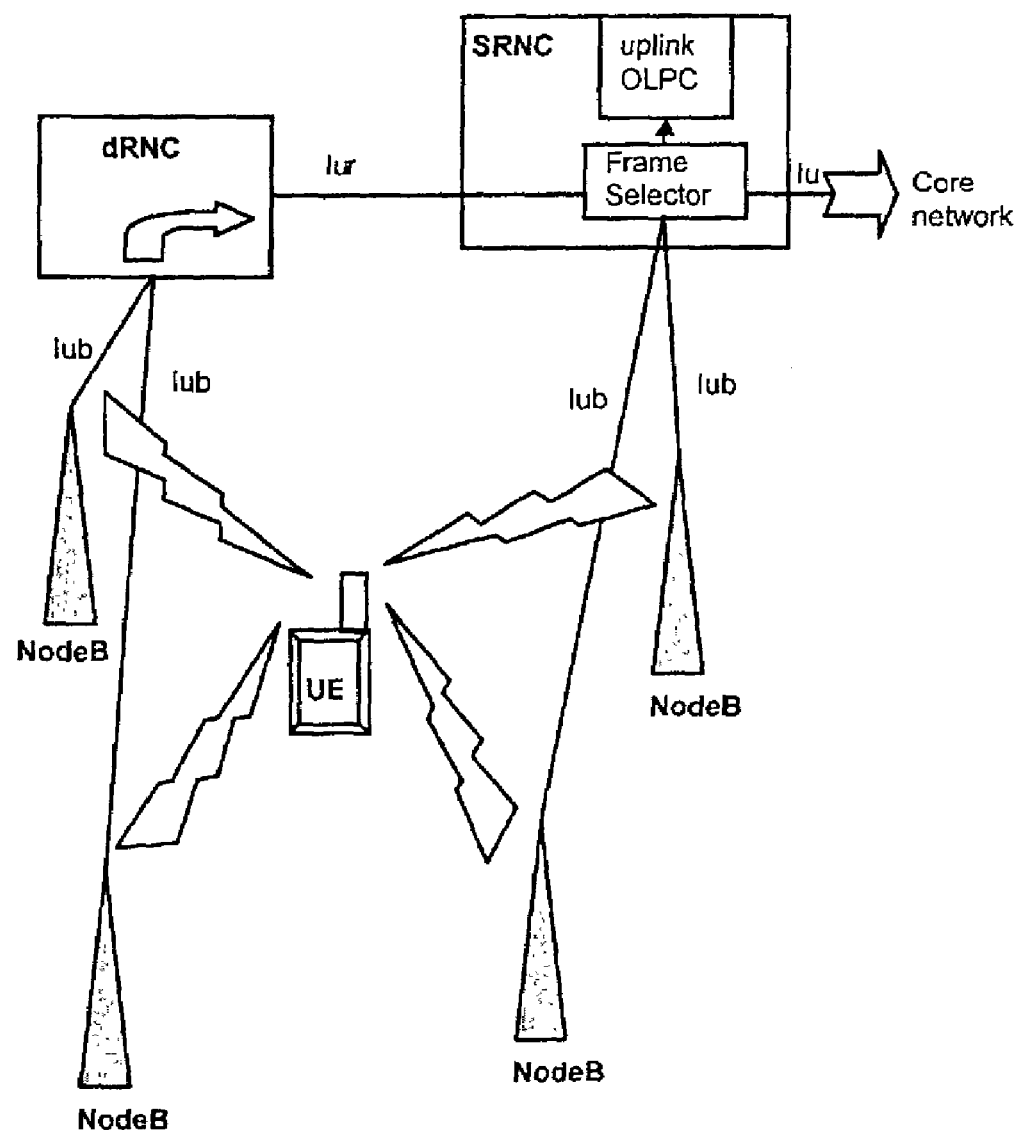
FIG. 3 is schematically illustrating the location of the uplink outer power control loop functionality in a UMTS-system according to the state of the art.

Firstly, regarding FIG. 3 showing an exemplar illustration of location of the uplink outer power control loop OLPC of an exemplar UMTS-based network according to the state of the art to provide a better understanding of the invention. As can be seen in the UMTS-based network, the uplink outer loop of power control OLPC is located in the radio network controller SRNC, which is serving the links of a respective user equipment UE, in particular, of a mobile station. Furthermore, also the frame selector "Frame Selector", for combining all received frames, is located in that serving RNC.

As it is indicated by flashes in FIG. 3, there are a plurality of radio legs related to the radio connection of the user equipment UE that are handled by more than one base transceiver station, each of which associated with a respective so called NodeB of the network. Consequently, it is possible to evaluate the link quality immediately after frame selection, whereby the link quality requirements are related exactly to the measurable link quality.

Since, however, the uplink inner power control loop, even it is not indicated in FIG. 3, is located at the base stations, there is usually a large signaling delay between the base stations and the serving network controller SRNC, degrading the speed and performance of the outer loop power control OLPC significantly. Reactions to changes in the environment will be delayed and the control loop needs to slow down to avoid instability problems. Hence such a decentralized architecture also implies an additional signaling traffic load on the links between the serving network controller SRNC and the NodeBs, i.e. on the link interfaces Iub. Moreover, in the case of a further drift network, controller dRNC associated with at least one of the NodeBs, also on the link interface Iur between the drift and the serving radio network controllers dRNC and SRNC. The link interface Iu is used to exchange information between the serving RNC and the further core network.

Figure 1:
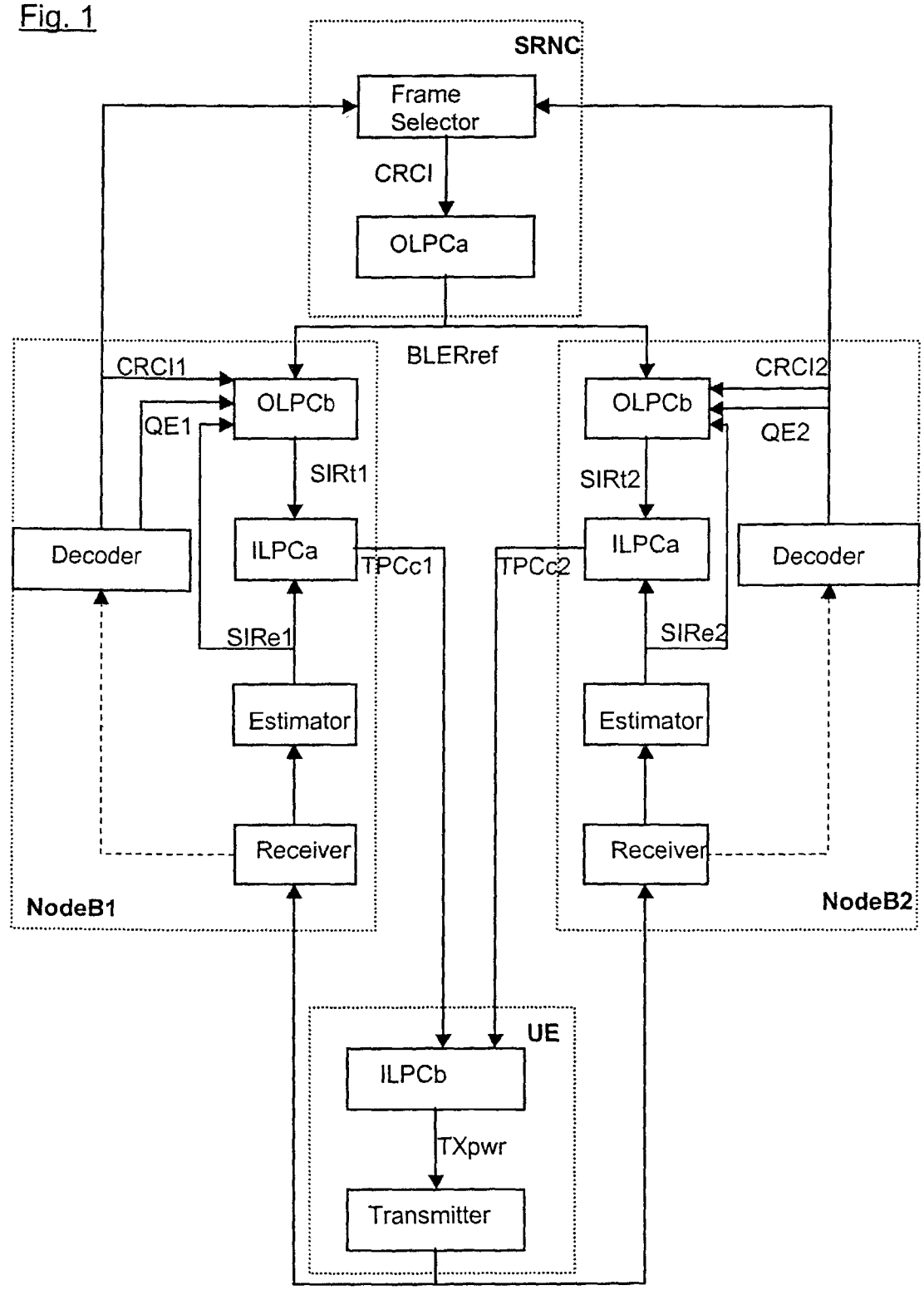
FIG. 1 is schematically depicting an information flow example for a two-way handover scenario according to the invention.

In comparison thereto, the outer power control loop OLPC according to the invention is distributed in general between the base transceiver station of the NodeB and the radio network controller SRNC, as can be seen in FIG. 1.

FIG. 1 shows an example of the information flow between network elements for the case of a two-way soft-handover and with the block error rate BLER used as the link quality criteria.

In detail, the schematically drafted user equipment UE is in two-way soft handover with the NodeB1 and the NodeB2. Thus, the receiver of each of the base stations comprised of the NodeB1 or the NodeB2, receives an information signal, which is transmitted by the transmitter of the user equipment UE using a certain transmission power TXpwr adjusted as described in the following by a unit means indicated as ILPCb. Each of the receivers are connected to an estimator for measuring the SIR ratio of the transmitted signal of the user equipment UE on the physical control channel. Furthermore, each of the NodeBs comprises an uplink inner power control loop ILPCa connected to the estimator and adapted to generate a power command TPCc1, or TPCc2, respectively, being a power-up or a power-down command by comparing the estimated signal to interference ratio SIRe1 or SIRe2 of the respective SIR estimator against a respective target signal to interference ratio SIRt1 or SIRt2. The power-up or the power-down commands TPCc1 and TPCc2 are then sent back to the user equipment UE on the downlink physical control channel so that in the drawn case the user equipment UE will receive by means of the unit ILPCb the transmission power command TPCc1 and TPCc2 from the base stations causing a change of the transmission power TXpwr of the user equipment UE by a predefined power step in dB.

As discussed above in the Background of the Invention, the mobile station UE combines the power commands in case of a soft-handover wherein the unit ILPCb will decrease the transmission power TXpwr if any of the power commands TPCc1 and TPCc2 is a power-down command and will increase the transmit power only if all power commands TPCc1 and TPCc2 are power-up commands.

According to the embodiment, as depicted, the NodeB1 and the NodeB2 also comprise a respective decoder connected to the respective receiver to decode the received data blocks of the signal transmitted by the user equipment UE and to evaluate a cyclic redundancy check in turn to evaluate whether the decoded block is in error or not. The result of this check, i.e. the cyclic redundancy check indication is denoted with CRCI1 and CRCI1, respectively. As known to a person skilled in the art, such a cyclic redundancy check CRCI is the most common measure for a block error rate controlled link quality control.

The inventive distributed uplink outer power control loop OLPCa and OLPCb, as described in more detail below, enables the use of further quality estimation techniques, too. A further quality estimate QE1 or QE2 is shown in FIG. 1. This measurement or estimate need not be transferred to the serving radio network controller SRNC and can be any proprietary link quality measurement regardless of the standardized procedures because it does not need to distribute outside the base stations.

Regarding the inventive two-stage uplink outer power control loop OLPCa and OLPCb in more detail, it is possible to fulfill both, the fast reaction on changes in the radio environment and the control of the overall link quality. As can be seen, a first outer power control loop OLPCb is located in each of the base transceiver stations of the NodeB1 or the NodeB2 to enable a fast reaction to changes in the radio environment. In soft-handover cases, as drafted by FIG. 1, for example, the overall link quality is usually different than the link quality of the single links. Thus the outer power control loop part OLPCb of a respective NodeB tries to achieve a kind of reference link quality BLERref brought forward by the serving radio network controller SRNC. This reference link quality BLERref is usually different than the required target overall link quality.

In particular, this reference link quality BLERref is set by a second outer power control loop part OLPCa which is located in the same network element as the frame selection, i.e. usually in the serving radio network controller SRNC. If the overall link quality is not good enough, then the reference link quality BLERref requirement is tightened. If the overall target link quality is too good the reference link quality requirement BLERref is weakened. According to the exemplar using the block error rate as the link quality criteria, such link quality is determined by using the cyclic redundancy check indications CRCI1 and CRCI2 of the respective base stations. If the combined redundancy check indication CRCI fails, the block or frame is in error. The combining gain of the frame selection is maximal if all the links have the same link quality. In this case, the reference link quality BLERref will be worse than the overall required target link quality. By using such reference link quality BLERref, the control of the target or necessary overall link quality is enabled substantially without having any large signaling delay between the inner and outer loops of power.

Furthermore, according to these embodiments the first means of the outer loop for power control OLPCb is adapted in that any increase of the target signal to interference ratio SIRt1 or target SIRt2 is prohibited if the means of the inner loop for power control loop, ILPCa and ILPCb, has not met the target SIR, SIRt1 or SIRt2, to a certain degree, previously. In other words, a target SIR SIRt1 or SIRt2 increase is allowed only if the current SIR is greater than the target SIR SIRt1 or SIRt2 minus a tolerance margin. This enables any wind-up effect caused by situations in which one of the links has no significant impact on the inner power control loop ILPC to be overcome.

Such a wind-up effect usually may be a result of a soft-handover, since the mobile station UE will only increase it's transmit power TXpwr if all power commands TPCc1 and TPCc2 are requesting a power increase. If, however, one of the links requires a power decrease, the mobile station UE will decrease its transmit power TXpwr. Thus, if one of the links has a worse SIR than the other one, it is quite likely that the stronger link meets the SIR target while the SIR of the weaker link will be lower than the target. Thus, without the restriction of target SIR increases, the first outer loop power control OLPCb of the base station, which is receiving the weaker link, will increase the target SIR, i.e. based on FIG. 1 SIRt1 or SIRt2. However, although that target SIR SIRt1 and/or SIRt2 has been increased, the stronger link will still control the SIR by sending power-up and/or power-down commands while the weaker link will mostly send power-up commands. Therefore, without the use of the invention, the target SIR SIRt1 or SIRt2 of the weaker link will wind-up step by step.

Moreover, by use of the invention, it is possible to improve the convergence of the overall link quality. Although the first part of the uplink outer loop for power control OLPCb located in the base station is controlling the link quality quite fast, the adaptation to the target link quality based on the required overall link quality is slower because of the still existing signaling delay between a respective NodeB and the serving radio network controller SRNC. If the overall link quality is worse than the required link quality, it takes some time to adapt the reference link quality BLERref until the required link quality is met. The strongest impact on the overall performance is seen if, for example, two strong links were in soft-handover, i.e. the reference link quality BLERref was worsened causing an increase of the transmission power TXpwr, and suddenly the soft-handover situation ends. In this case, the reference link quality BLERref is too bad until the second outer loop means for power control OLPCa adapts the reference quality BLERref again.

Therefore, to mitigate such a situation each linked NodeB preferably adapts the reference link quality BLERref in definable functional dependence on the respective actual difference between the current SIR and the respective target SIR SIRt1 or SIRt2 by the first outer power control loop part OLPCb. If the current SIR of a link meets the respective target SIR SIRt1 or SIRt2, the reference quality is equal to the required quality. In this case, this link is the only important link. Practically, the reference quality is decreased proportionally to the difference between the target SIR SIRt1 or SIRt2 and the current SIR. As a result, such decentralized mapping avoids too heavy changes in the overall link quality if the combining gain of the frame selection is changing.

In general, all the above described inventive features can be implemented without the need for undue hardware changes and practically can be even done remotely, in particular via loading or implementing an operating software appropriately adapted to the specific system or network constraints into the base stations and/or radio network controllers, so that no site visits are necessary to implement the features.

Figure 2:
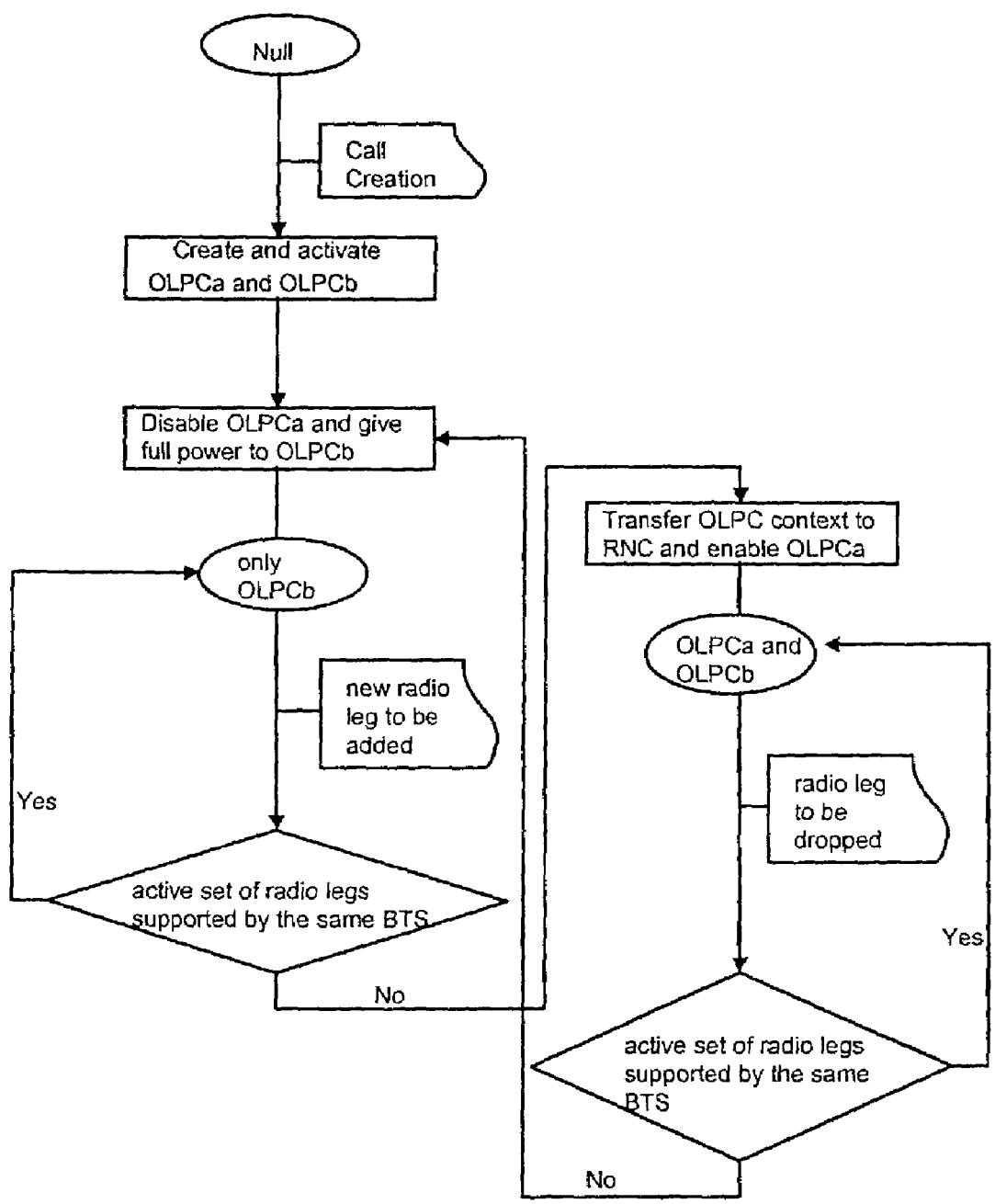
FIG. 2 is schematically depicting an information flow example for the management of the inventive two-stage outer power control loop configuration changes.

Using such an implemented controlling functionality FIG. 2 is schematically representing an exemplar information flow including a further refinement for managing the distributed outer power control loop OLPCa and OLPCb due to changes in the handling of the radio legs related to the mobile station UE.

In particular, when a mobile station is locked on a mobile radio communication network or respectively a call creation is performed, firstly the functionality of the outer power control loop part OLPCa of the serving radio network controller SRNC is created and activated, so that the aforementioned process may be performed. Additionally, or simultaneously, the second outer power control loop part OLPCb of the base station BTS or NodeB to which the mobile station is linked is created and activated so that the respective associated process may be performed.

If, however, the at least one radio leg related to the created radio link connection is handled by merely one single base station the second outer power control loop part OLPCa located at the radio network controller is disabled and the entire power is provided for functionality of the first outer power control loop OLPCb of the respective base station. Since there is no reason in such a case for monitoring the quality of the radio bearer from the serving radio network controller SRNC, merely an unnecessary but extra way of signaling, delay and hence a control delay between the base station and the radio network controller, as described above, would be introduced. Thus, if the at least one radio leg related to the radio connection is handled by one single base station, the performance of the system is therefore improved if only the first outer power control loop OLPCb at the base station is operating.

If a new radio leg is added, it is proved whether all of the active radio legs are still supported by the same base station or not. If the actual set of radio legs is still handled by one base station, the functionality of the second outer power control loop OLPCa may be still deactivated. If this, however, is not the case, i.e. if the actual set of radio legs is handled by more than one base station, the second outer power control loop OLPCa of the radio network controller RNC is activated so that the first outer power control loop functionality OLPCb and the second outer power control loop functionality OLPCa of the radio network controller RNC run parallel, thereby exchanging information over the Iub and/or Iur interfaces in order to stay synchronized. Preferably, specific information relating to the outer power control loop OLPC in general is firstly transferred to the radio network controller RNC to improving the operating starting process of the second outer power control loop functionality OLPCa of the radio network controller.

As a consequence, the outer power control loop is then again distributed between the base station and the radio network controller, wherein preferably the second outer power control loop OLPCa, located after the frame selector at the serving radio network controller SRNC, provides the master control functionality whilst the means for providing the functionality of the first outer power control loop part OLPCb of the base station has only a restricted decision-power, as described above.

In case a radio leg is dropped, it is again proved if the new set of active legs is supported by the same base station or not. If this is the case, then the second outer power control loop OLPCa of the radio network controller is again disabled and the full power in turn is given to the first outer power control loop OLPCb of the base station.

Consequently, by activating or deactivating the second outer power control loop OLPCa of the radio network controller, in dependent on whether the radio legs are handled by more than one base station or respectively by a single base station, the whole advantages of distributed and centralized outer power control loop architectures are supported by simultaneously optimizing the related signaling traffic between the base station and radio network controllers.

What is claimed is:

1. A method for controlling the transmission power in the uplink direction from a user equipment in a CDMA-based radio system that comprises at least one base station, an associated serving radio network controller, an inner power control loop that adjusts transmission power between the user equipment and at least one of the base stations based on the signal to interference ratio, and an outer power control loop that adjusts the target signal to interference ratio based on a link quality, the method comprising:

providing the outer power control loop by:
establishing at the at least one base station a first outer power control loop stage of an outer power control loop for the at least one base station and the user equipment in which a target signal to interference ratio is adjusted according to which the user equipment adjusts the uplink transmission power; and
establishing at the associated serving radio network controller a second outer power control loop stage of said outer power control loop for the associated serving radio network controller and the at least one base station for ensuring a target link quality necessary for fulfilling a predetermined quality of service.

2. The method of claim 1, wherein the second outer power control loop ensures the target link quality based on a necessary overall link quality and provides a reference link quality for the first outer control loop to enable a predetermined quality of service in view of transmission delay based on retransmission of erroneous signal components.

3. The method of claim 1, wherein said first outer power control loop adjusts the target signal to interference ratio so as to ensure a reference link quality set by the second outer control loop.

4. The method of claim 2, wherein the first outer power control loop generates the target signal to interference ratio faster than the second outer power control loop generates the reference link quality.

5. The method of claim 1, wherein the second outer power control loop is activated at least based on a soft handover between the user equipment and a plurality of base stations, and/or deactivated based on a radio link between the user equipment and only one base station.

6. The method of claim 1, wherein a reference link quality set by the second outer control loop is adapted by the first outer power control loop depending on the difference between the target signal to interference ratio and the respective current signal to interference ratio to avoid too heavy changes in the overall link quality if the combining gain of frame selection is changing.

7. The method of claim 1, wherein the first outer power control loop restricts the target signal to interference ratio to a constant value and/or to a value having a predefined increase based on the difference between the target signal to interference ratio and the current signal to interference ratio when said target signal to interference ratio is not met.

8. In a wireless communication system that comprises at least one base station and an associated serving radio network controller, apparatus for controlling the transmission power in the uplink direction from a user equipment comprising:

first outer power control loop means at the at least one base station for establishing a first outer power control loop stage of an outer power control loop between the at least one base station and the user equipment for adjusting a target signal to interference ratio according to which the user equipment adjusts the uplink transmission power; and
second outer power control loop means at the associated serving radio network controller for establishing a second outer power control loop stage of said outer power control loop between the at least one base station and the associated serving radio network controller for ensuring a target link quality necessary for fulfilling a predetermined quality of service.

9. A base transceiver station for use in a wireless communication system with a user equipment and an associated radio network controller, comprising:

means operative in the base transceiver station for establishing a first outer power control loop stage of an outer power control loop between the base transceiver station and the user equipment for adjusting a target signal to interference ratio based on a reference link quality, and
means operative in the base transceiver station to interface with the associated radio network controller for establishing a second outer power control loop stage of said outer power control loop at the associated radio network controller for the base transceiver station and the associated radio network controller for ensuring a target link quality for fulfilling a predetermined quality of service.

10. A software product for incorporation within a wireless communication system for controlling the transmission power in the uplink direction from a user equipment in the UMTS-system that comprises at least one base station, an associated serving radio network controller, an inner power control loop that adjusts transmission power between the user equipment and at least one of the base stations based on the signal to interference ratio, and an outer power control loop that adjusts the target signal to interference ratio based on a link quality, the software product performing the steps of:

provinding the outer power control loop by:

establishing at the at least one base station a first outer power control loop stage of an outer power control loop for the at least one base station and the user equipment in which a target signal to interference ratio is adjusted according to which the user equipment adjusts the uplink transmission power; and establishing at the at least one base station a second outer power control loop stage of said outer power control loop for the associated serving radio network controller and the at least one base station for ensuring a target link quality necessary for fulfilling a predetermined quality of service.

* * * * *